United States Patent
Christensen et al.

(10) Patent No.: US 6,698,245 B1
(45) Date of Patent: Mar. 2, 2004

(54) PRODUCTION OF VITREOUS FIBRES USING HIGH HALOGEN MINERAL WASTE AS AN INGREDIENT

(75) Inventors: Vermund Rust Christensen, Roskilde (DK); Soren Lund Jensen, Holte (DK); Jens Ranlov, Charlottenlund (DK)

(73) Assignee: Rockwool International A/S (DK)

( * ) Notice: Subject to any disclaimer, the term of this patent is extended or adjusted under 35 U.S.C. 154(b) by 0 days.

(21) Appl. No.: 09/555,692

(22) PCT Filed: Dec. 2, 1998

(86) PCT No.: PCT/EP98/07828

§ 371 (c)(1),
(2), (4) Date: Jul. 25, 2000

(87) PCT Pub. No.: WO99/28253

PCT Pub. Date: Jun. 10, 1999

(30) Foreign Application Priority Data

Dec. 2, 1997 (EP) .............................. 97903675

(51) Int. Cl.[7] .............................................. C03B 37/00
(52) U.S. Cl. ............................ 65/376; 65/482; 65/121; 65/134.6; 65/134.8; 501/30; 501/36
(58) Field of Search ...................... 501/30, 36; 65/482, 65/376, 121, 134.6, 134.8

(56) References Cited

U.S. PATENT DOCUMENTS

| | | | | |
|---|---|---|---|---|
| 2,035,318 A | * | 3/1936 | Hood | 351/44 |
| 2,467,889 A | * | 4/1949 | Harter | 264/DIG. 19 |
| 2,882,173 A | * | 4/1959 | Welsch | 501/30 |
| 3,274,006 A | * | 9/1966 | McKinnis | 501/27 |
| 3,682,666 A | * | 8/1972 | LaCourrege | 427/215 |
| 4,282,019 A | * | 8/1981 | Dunn et al. | 501/30 |
| 4,298,369 A | * | 11/1981 | Froberg et al. | 501/53 |
| 4,405,723 A | * | 9/1983 | Kainzner et al. | 501/36 |
| 4,521,523 A | * | 6/1985 | Aubourg et al. | 501/30 |
| 4,822,388 A | | 4/1989 | Gee | 65/2 |
| 5,198,190 A | | 3/1993 | Philipp et al. | 420/582 |
| 5,945,360 A | * | 8/1999 | Harding et al. | 501/35 |

FOREIGN PATENT DOCUMENTS

| | | | | |
|---|---|---|---|---|
| FR | 94979 | * | 2/1970 | 501/36 |
| WO | 96/14274 | | 5/1996 | |
| WO | 96/14454 | | 5/1996 | |
| WO | 97/30002 | | 8/1997 | |

OTHER PUBLICATIONS

Grant and Hackh's Chemical Dictionary, 1991, p. 241. Definition of "flux".*

* cited by examiner

Primary Examiner—John Hoffmann
(74) Attorney, Agent, or Firm—Dickstein, Shapiro, Morin & Oshinsky, LLP.

(57) ABSTRACT

Rock fibres are made from a melt formed from a blend of low and high halogen waste materials. 80 to 98% are low halogen materials (containing less than 0.5 wt. % halogen) and 2 to 20% are high halogen materials (containing at least 1 wt. % halogen).

14 Claims, 2 Drawing Sheets

PRODUCTION OF VITREOUS FIBRES USING HIGH HALOGEN MINERAL WASTE AS AN INGREDIENT

This invention relates to methods of making man-made vitreous fibres (MMVF) and in particular to the manufacture of rock fibres.

MMV fibres are made by melting mineral solids and thereby forming a mineral melt, and then fiberising the melt by, usually, a centrifugal fiberising process.

Rock fibres (by which we include stone and slag fibres) are usually made from cheaper raw materials (often including waste materials) and by more economic processes than are used for glass fibres. Because many glass fibres are required to have particular properties that justify the cost and inconvenience of handling fluoride-containing or other difficult raw materials, it is economic to include such raw materials in the melt. Thus the associated cost of, for instance, effluent control processes may be fully justified by the improved strength or other physical properties of the glass fibres that are obtained. However rock fibres generally do not need to have such onerous physical properties and achieve their main objective of providing good insulation if it is possible to form them to an appropriate small fibre diameter, adequate length and minimum shot formation.

It is therefore not only possible but also desirable to utilise some recycled waste material as part of the charge for forming the rock melt from which rock fibres are made. These waste materials include waste MMV fibres but also include numerous other wastes such as fly ash.

Despite the widespread use of wastes in the manufacture of rock fibres, in practice the wastes which are used are never wastes that contain environmentally significant amounts of toxic materials. This is because there is no perceived benefit in using a toxic waste in preference to a non-toxic waste, and because the use of a toxic waste would necessarily require modified procedures, such as the provision of rigorous effluent treatment systems. Accordingly the numerous references in the literature to the manufacture of rock fibres using wastes such as fly ash have always related to the use of non-toxic fly ash, in contrast to the special forms of fly ash which can contain significant amounts of toxic material, for instance at least 1% fluoride. similarly, the halide content of some virgin rock can be variable. Thus some grades of apatite have low halide content but others are more toxic because they have high halide content, and so have to be treated as toxic wastes.

One particular description of a process using industrial wastes is in U.S. Pat. No. 5,364,447. This describes a complex method of treating the wastes and forming fibres from melt which is produced in one part of the process. There is no detailed description of what charge should be used for forming the melt but it appears that the charge will be formed entirely of hazardous waste materials.

Similarly, another complex process for dealing with hazardous material is described in U.S. Pat. No. 5,134,944 but again this does not appreciate the possibility of actually being able to obtain significant benefit in the fibre forming process by the use of small amounts of particular wastes.

Accordingly, deliberate and controlled amounts of fluoride-containing raw materials have been used in glass fibre production in order to promote the properties required for some particular uses of glass fibres but variable wastes generally have not been used (because of the variable impact on the properties of the glass fibres), whilst wastes have been used for rock fibres but fluoride-containing and other toxic wastes have been considered undesirable because there is no justification for providing the necessary modifications in procedures, for instance in effluent treatment.

We have now realised that the efficiency of rock fibre production (especially as regards the amount of shot which is formed) is improved by the use of a high halogen waste and that, contrary to conventional thinking, it is in fact very desirable to make rock fibres from a charge which contains a high halogen mineral waste.

In the invention rock fibres are made by a process comprising forming a pool of rock melt by melting mineral solids and forming fibres from the melt, and in this process 80 to 98% by weight of the mineral solids are low-halogen mineral materials that each contain less than 0.5% by weight halogen and 2 to 20% by weight of the mineral solids are high halogen mineral waste containing at least 1% by weight halogen.

We use the term "rock fibres" to distinguish the products from glass fibres. In the following discussion of compositions, all amounts are expressed in terms of the weight of oxide.

Glass fibres traditionally contain relatively low total amounts of alkaline earth metal and iron (calcium, magnesium and iron), generally below 12%. However the rock fibres of the invention contain more than 15%, and usually more than 20%, calcium, magnesium and iron (total of all three oxides). Glass fibres are generally substantially free of iron, but the rock fibres made in the invention generally contain at least 1%, and often at least 3% and frequently 5 to 12% or more iron measured as FeO.

Glass fibres traditionally contain a high content of alkali metal (sodium oxide plus potassium oxide), usually above 12%, but the rock fibres made in the invention preferably contain below 10% alkali metal.

The rock fibres generally contain silica in an amount which is from 30 to 70%. Various other oxides, including especially alumina, are also often present.

The invention is of particular value in the production of fibres which can be shown to be soluble in physiological saline. Some such fibres contain a relatively low amount of aluminium, for instance not more than 4%, optionally together with 1 to 5% phosphorus and 1 to 5% boron (all measured as oxides, by weight). Typical of these low aluminium fibres are the disclosures in, for instance, EP-A-459,897 and in WO92/09536, WO93/22251 and WO96/00196. Reference should be made to each of these.

However the invention is of particular value when applied to the production of fibres which have higher aluminium contents, for instance at least 15% and usually at least 17% and most usually at least 18% $Al_2O_3$, e.g., up to 30, 35 or 40% $Al_2O_3$.

The invention is particularly suitable for making high aluminium fibres because many wastes containing more than 30 or 40% aluminium (as $Al_2O_3$) also contain significant amounts of fluoride or other halide. Suitable high aluminium, biologically soluble, fibres which can advantageously be made in the present invention are described in WO96/14454 and WO96/14274. Others are described in WO97/29057, DE-U-2,970,027 and WO97/30002. Reference should be made to each of these. In general the fibres and the melt from which they are formed have an analysis (measured as % by weight of oxides) within the various ranges defined by the following normal and preferred lower and upper limits:

$SiO_2$ at least 30, 32, 35 or 37; not more than 51, 48, 45 or 43

$Al_2O_3$ at least 14, 15, 16 or 18; not more than 35, 30, 26 or 23

CaO at least 8 or 10; not more than 30, 25 or 20

MgO at least 2 or 5; not more than 25, 20 or 15

FeO (including $Fe_2O_3$) at least 2 or 5; not more than 15, 12 or 10

FeO+MgO at least 10, 12, 15; not more than 30, 25, 20

$Na_2O+K_2O$ zero or at least 1; not more than 10

$CaO+Na_2O+K_2O$ at least 10, 15; not more than 30, 25

$TiO_2$ zero or at least 1; not more than 6, 4, 2

$TiO_2$+FeO at least 4, 6; not more than 18, 12

$B_2O_3$ zero or at least 1; not more than 5, 3

$P_2O_5$ zero or at least 1; not more than 8, 5

Others zero or at least 1; not more than 8, 5

The fibres preferably have a sintering temperature above 800° C., more preferably above 1000° C.

The melt preferably has a viscosity at fibre forming temperature of 5 to 100 poise, preferably 10 to 70 poise at 1400° C.

The fibres preferably have an adequate solubility in lung fluids as shown by in vivo tests or in vitro tests, typically conducted in physiological saline buffered to about pH 4.5. Suitable solubilities are described in WO96/14454. Usually the rate of dissolution is at least 10 or 20 nm per day in that saline.

In the invention at least ⅘ths of the total mineral charge is a low halogen material and thus may be any of the materials (waste or virgin) which are traditionally used for forming rock melt. However a minor proportion of the total charge is high halogen waste and the incorporation of this has the advantage that it not only utilises this material (for which at present there are very limited industrial uses) but also has a beneficial effect on the properties of the melt.

The amount of halogen in the low halogen materials is always less than 0.5% and is generally less than 0.2%, for instance in the range 0.01 to 0.1%.

The amount of halogen in the high halogen component is always at least 1% and is generally at least 3% and often at least 5 or 10% and may be up to 25% or more (by weight).

The percentage of high halogen material in the total mineral solids is always at least 2% and is usually at least 5%. It should not be more than about 20% because at higher values it can be difficult simultaneously to achieve the desired chemical analysis of the fibres and good fiberisation performance. Generally at least 50%, and frequently 80% or even 95%, by weight of the halogen is fluorine.

High halogen mineral wastes which can be used in the invention include high halogen fly ash, scrubber ash, used graphite lining from Al-production, ladle slag and converter slag. Other suitable wastes which contain high levels of aluminium as well as halogen include aluminium slags, e.g. wastes from the secondary production of aluminium. Such materials are generically described as "aluminium dross" or "aluminium oxide dross". In particular materials of interest are those which contain from 0.5 to 10 wt. %, preferably 2 to 6 wt. %, more preferably below 5 wt. %, metallic aluminium and 50 to 90 wt. %, preferably below 85 wt. %, more preferably 60 to 72 wt. %, alumina $Al_2O_3$. Preferred wastes are those obtained from the aluminium casting process. Many of these materials are described generally as aluminium dross, but in particular the process provides one specific alumina-rich waste material described in the industry as "alu-dross". This tends to contain significant proportions of metallic aluminium and is thus treated in order to retrieve the metallic aluminium. The alu-dross is generally crushed, milled and sieved. This produces some aluminium for resale and an aluminium rich fraction which is sent to a furnace for reuse. As a by product an alumina-rich product is also produced and is described as "crushed alu dross". This alumina-rich powder generated from treated of alu-dross (crushed alu-dross) may contain levels of halogen materials of for instance 1 to 10% and can be used in the invention as the high halogen waste. The aluminium-rich fraction, optionally together with other aluminium-containing waste materials, is subjected to remelting in a furnace. This may be a rotating furnace or kiln. The aluminium waste may be subjected to plasma heating. A conventional furnace may also be used. Salt is usually added to the furnace in order to reduce the surface tension of the aluminium and reduce oxidation. This process produces an aluminium fraction for resale, more alu-dross and a salt slag material. The salt slag can be subjected to a wet chemical process (involving water washing and high temperature treatment) which produces a salt fraction, which is recycled to the furnace, and a further alumina-rich powder. This second alumina-rich powder is described as "treated aluminium salt slag". This product may contain levels of halogen of for instance 0 or 0.5% to 3 or 5%, and can be used as a high halogen material in the invention when the amount is at least 1%. The high halogen waste can be a virgin rock which has a high halogen content, e.g., a grade of apatite which contains more than 2% or 5% fluoride or other halide. The high halogen fly ash and other wastes are different from the conventional fly ashes and other wastes which have been proposed in the literature, because the high halogen wastes contain at least 1% (and usually more) halogen, generally fluorine alone or fluorine with chlorine.

The ability to use these is particularly beneficial as they are widely available and there are very few uses for these materials.

The total amount of halogen in the melt is typically in the range 0.2 or 0.3% to 5%. Preferably it is above 0.5, most preferably above 1% or above 2%. The halogen is present in combined form, as metal halide. The amount of chlorine in the melt is usually relatively low because of its low solubility in the melt and is typically in the range 0.01 to 0.5%. The amount of fluorine in the melt can be higher and is typically in the range 0.05 to 5%. Best results are achieved when the melt contains 0.3 to 2%, often above 0.5 or 1%, fluorine. When considering these amounts, it must be remembered that the amount of fluorine or other halogen in the charge was, prior to the invention, typically zero or as close to zero as is possible, and would always be significantly below the amounts which are now deliberately added. In particular, the formation of a melt containing more than 0.2% fluorine would, prior to the invention, have been considered unacceptable and unnecessary for the manufacture of rock fibres.

An advantage of the inclusion of fluorine (or chlorine) in the amounts proposed above is that it tends to result in a decrease in the viscosity of the melt throughout a relatively wide temperature range. Since melt viscosity tends to be a very important parameter in the control of fibre formation, the ability to reduce it in this manner, and in particular to reduce it over a wide range of temperatures, allows significant improvement in the ability to control the fibre forming processes. This control is particularly valuable when the low halogen mineral itself includes wastes, as these may be of variable composition.

The inclusion of fluoride (or other halogen) also has a beneficial impact on the liquidus temperature and this again can facilitate control of the fibre forming process or reduce the necessary melting temperature and thereby save energy for heating.

Another important advantage of the inclusion of fluoride (or other halogen) is that it reduces the surface tension of the melt, for instance by as much as 10%, and this again has a significant impact on the fibre forming process, both as regards initiation and attenuation of the fibres. In particular, it can result in reduction of the amount of shot (i.e., coarse particles, above 63 μm diameter).

Another advantage of the inclusion of fluorine (or chlorine) or other halogen in the melt is that it tends to enhance the solubility of the MMV fibres in physiological liquids, for instance when tested by in vitro dissolution tests in simulated lung fluid. Thus, by increasing the amount of fluorine and/or chlorine by incorporating high halogen mineral waste, but while keeping the analysis of other components in the melt substantially unchanged, physiological dissolution is increased. For instance when dissolution is measured as described in Mattson, S. in Ann. Occup. Hyg., vol 38, p. 857–877, 1994 a regression analysis of the data (on a wt % base) proves that $F_2$ has an influence on the dissolution rate comparable with CaO and BaO (increased dissolution rate).

If the melting conditions are such that effluent gases 1 are generated containing unacceptable amounts of halogen, the effluent gases are preferably scrubbed 2 before discharge to the atmosphere 3 with a material which will form a solid halide upon reaction with the effluent gases. A suitable material is wet or dry lime, usually quick lime. Another material is sodium bicarbonate. The solid halide can be dumped or used for some other purpose, but preferably it is added to the mineral solids as part of the mineral charge, usually as part of the high halogen mineral waste 4. Thus the halide in the effluent is preferably recycled back into the mineral solids.

Figure 1:
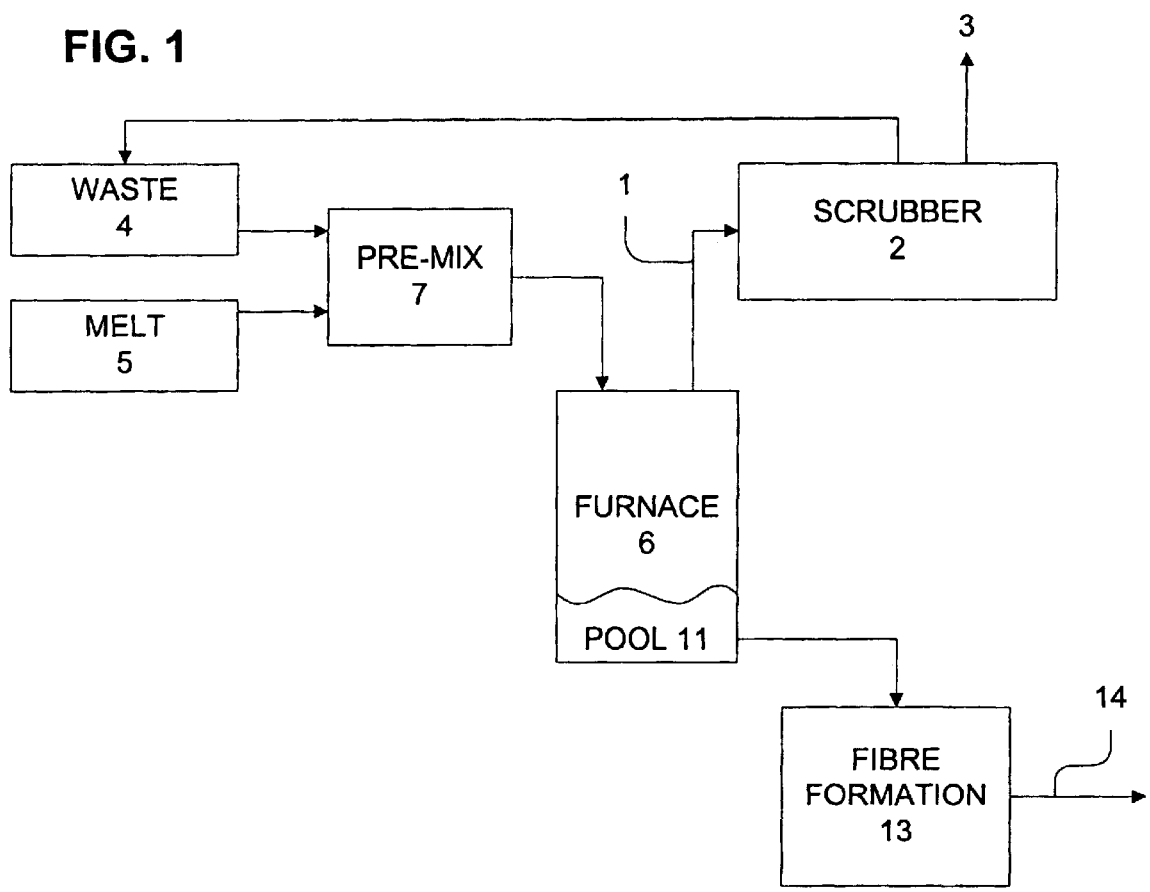
FIG. 1 illustrates a process of the invention in which effluent gases are scrubbed with material which forms a solid halide upon reaction with the effluent gases and the solid halide is recycled back into the mineral solids. The high halogen mineral waste and low halogen mineral materials are melted together in a furnace.

The melting of the mineral solids may be conducted by melting the low halogen mineral materials 5 and the high halogen mineral waste 4 together in a furnace 6, generally as a result of pre-mixing the materials 7 and charging them as a mixture to the furnace, as shown in FIG. 1.

Figure 2:
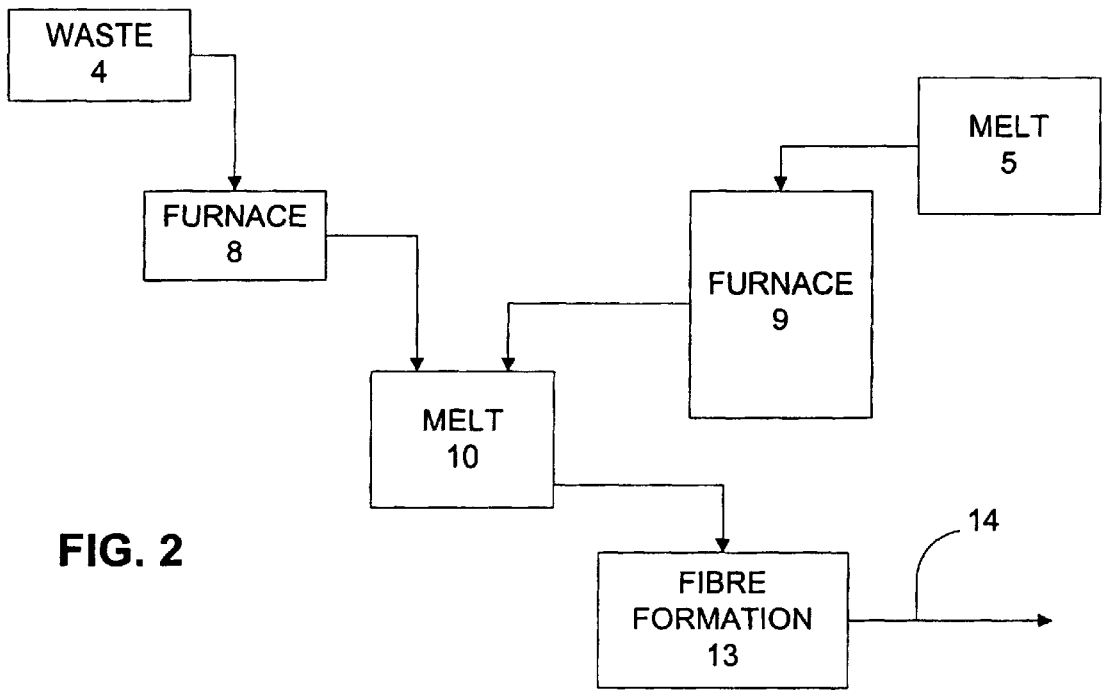
FIG. 2 shows an alternative system in which the high halogen mineral waste and the low halogen mineral material are melted in separated furnaces.

Alternatively, as shown in FIG. 2, in the high halogen mineral waste 4 is melted in a furnace 8 to form a high halogen melt and the low halogen mineral material 5 is melted in a separate furnace 9 to form a low halogen melt (but of course some of the low halogen mineral material can be included in the high halogen furnace if required), and the resultant high halogen and low halogen melts are mixed to form a blended melt 10 and the fibres are formed 13 from the blended melt.

Any of the typical furnaces used for forming MMVF melts can be used. For instance either furnace can be a shaft furnace in which a stack of granular mineral material is heated and melt drains to the base of the stack as a pool 11 from which it is run off to the fibre forming process, but in some instances the melt is run from the base of the stack into another chamber where it collects as a pool and from which it is run off to the fibre forming process. The preferred type of shaft furnace is a cupola.

Instead of using a shaft furnace, the furnace may be a tank furnace, by which we include gas or oil fired tank furnaces, molybdenum and graphite electrode tank furnaces and electric are furnaces. Preferably the high halogen waste is melted in an electric or plasma furnace so as to minimise effluent gases, and the low halogen waste can be melted in any conventional furnace, such as a cupola or other shaft furnace. Such a process is described in our application WO 99/28248, filed even date herewith and claiming priority from European application number 97309667.0.

Figure 3:
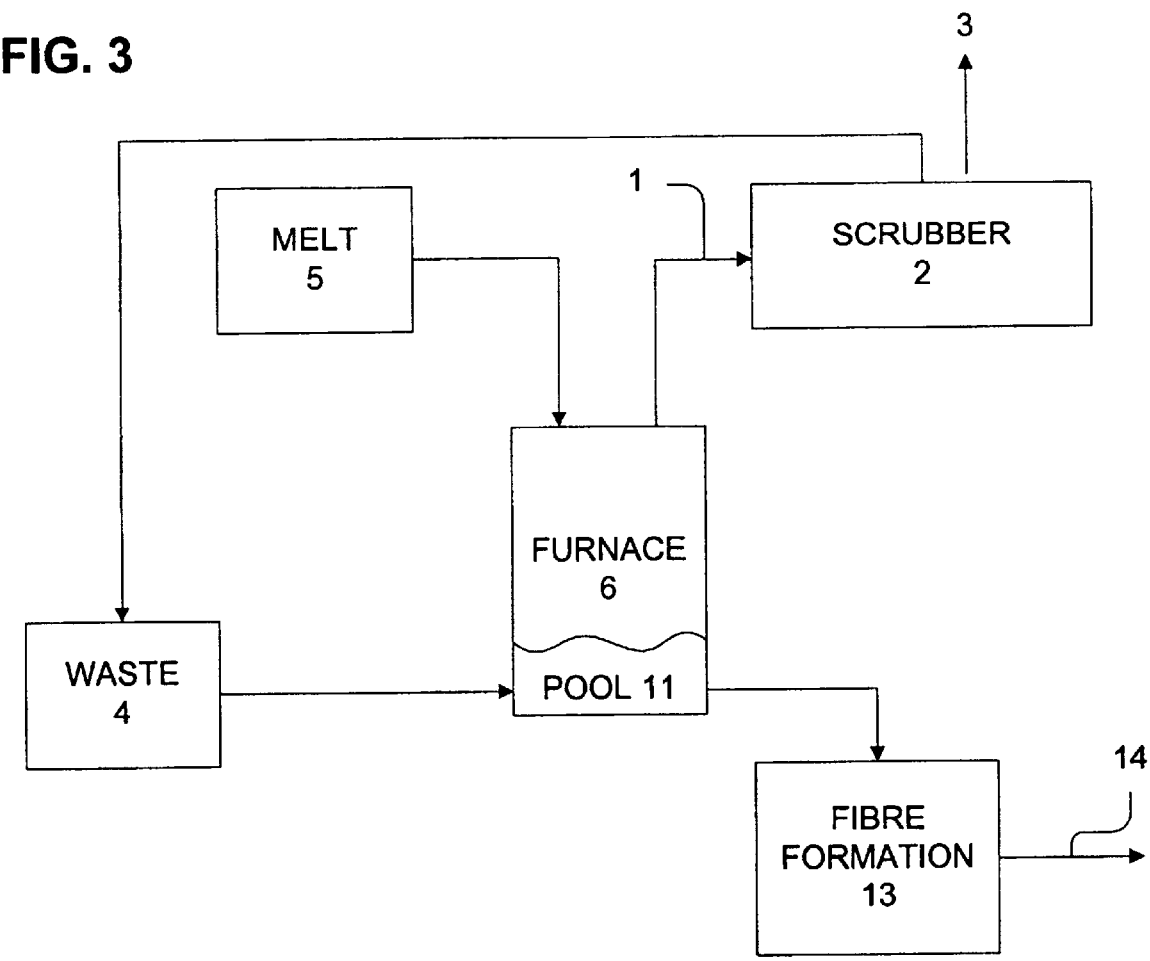
FIG. 3 shows a further alternative system in which high halogen mineral waste is fed into the melt in the furnace.

In order to minimise the volatilisation of halogen, it can be preferred to add the high halogen mineral waste either directly into the melt or immediately above the melt. For instance, as shown in FIG. 3, powdered high halogen mineral waste 4 can be fed into the melt in a tank furnace or the melt pool 11 of a shaft furnace by screw feeding the powdered waste into the melt or by blowing the powdered waste, entrained in air, through lances into the melt. The powder will then become molten within the melt with minimum escape of halogen.

In other processes, where a shaft furnace is used, combustion air is normally blown into the base of the shaft furnace through tuyeres and powdered high halogen mineral waste can be included in the combustion air. Again, introduction in this position will minimise the escape of halogen in the effluent gases. In order to allow the introduction of significant amounts of the high halogen waste through the tuyeres without undesirable cooling effects, it can be desirable to introduce the waste entrained in combustion air heated to above 700° C., for instance as described in our application WO 99/26846, filed even date herewith and claiming priority from European application number 97309676.1.

When the high halogen waste is being added as a powder, its particle size is usually below 3 mm, for instance in the range 0.1 to 2 mm.

If the high halogen waste is not being added as a powder, it may be charged to the furnace in which it is to be melted in conventional granular form, and likewise the remainder of the total charge may be supplied in conventional granular form. For instance it may have a granular size above 50 mm when it is being melted in a shaft furnace and 5 to 30 mm when it is being melted in a tank furnace. The granular material may be briquettes. It is possible to use briquettes which are formed from a mixture of the high and low halogen materials.

The low halogen materials can be any of the virgin or recycled materials conventionally used for the production of rock fibres. The high halogen materials can be any materials that have the desired high fluoride or other halogen content, as discussed above.

Because the waste materials may be of variable content, it can be desirable to monitor the melt or the fibre properties and to change the process conditions as necessary in order to maintain uniform production. Preferably this is done as described in our application WO 99/28352, filed even date herewith and claiming priority from European application number 97309674.6.

The MMV fibres 14 may be made from the fibre forming mineral melt in conventional manner. Generally they are made by a centrifugal fibre forming process. For instance the fibres may be formed by a spining cup process in which they are thrown outwardly through perforations in a spinning cup, or melt may be thrown off a rotating disc and fibre formation may be promoted by blasting jets of gas through the melt, or fibre formation may be conducted by pouring the melt onto the first rotor in a cascade spinner 13. Preferably the melt is poured onto the first of a set of two, three or four rotors each of which rotates about a substantially horizontal axis whereby melt on the first rotor is primarily thrown onto the second (lower) rotor although some may be thrown off the first rotor as fibres, and melt on the second rotor is thrown off as fibres although some may be thrown towards the third (lower) rotor, and so forth.

The following are examples. Each of these describes a charge for a cupola furnace and the analysis of the subsequent melt which can be fiberised, for instance using a cascade spinner.

EXAMPLE 1

40% diabase

60% briquettes consisting of

9% cement

14% Converter slag

13% aluminium dross (treated aluminium salt slag)

41% wool waste

23% diabase split resulting chemical composition (in wt %)

| $SiO_2$ | $Al_2O_3$ | $TiO_2$ | $FeO$ | $CaO$ | $MgO$ | $Na_2O$ | $K_2O$ | $F_2$ |
|---|---|---|---|---|---|---|---|---|
| 43.1 | 17.3 | 1.8 | 7.8 | 15.5 | 9.8 | 2.2 | 1.0 | 0.35 |

EXAMPLE 2

40% diabase

60% briquettes consisting of

9% cement

23% ladle slag

14% aluminium dross (treated aluminium salt slag)

45% wool waste

9% diabase split resulting chemical composition (in wt %)

| $SiO_2$ | $Al_2O_3$ | $TiO_2$ | $FeO$ | $CaO$ | $MgO$ | $Na_2O$ | $K_2O$ | $F_2$ |
|---|---|---|---|---|---|---|---|---|
| 38.0 | 22.8 | 1.5 | 6.8 | 18.5 | 7.7 | 1.7 | 1.0 | 0.45 |

EXAMPLE 3

75% diabase

5% lime stone

20% ladle slag resulting chemical composition (in wt %)

| $SiO_2$ | $Al_2O_3$ | $TiO_2$ | $FeO$ | $CaO$ | $MgO$ | $Na_2O$ | $K_2O$ | $F_2$ |
|---|---|---|---|---|---|---|---|---|
| 39.7 | 19.9 | 1.9 | 8.0 | 17.8 | 8.1 | 2.2 | 0.9 | 0.5 |

EXAMPLE 4

| Diabase | 50% |
|---|---|
| Spent potliner | 10% |
| Briquette | 40% |
| Briquette composition: | |
| Portland cement | 15% |
| Waste from mineral wool production | 40% |
| Calcined Chinese Bauxite | 24% |
| Converter slag | 21% |

The potliner and slag both contain fluorine.

Chemical composition of melt:

| $SiO_2$ | 38.5 |
|---|---|
| $Al_2O_3$ | 23.1 |
| $TiO_2$ | 1.9 |
| $FeO$ | 7.4 |
| $CaO$ | 15.9 |
| $MgO$ | 7.8 |
| $Na_2O$ | 4.0 |
| $K_2O$ | 0.8 |
| $F_2$ | 0.6 |
| $Cl_2$ | 0.0 |

Melt viscosity no higher than 25 Poise at 1400° C.

EXAMPLE 5

| Diabase | 50% |
|---|---|
| Spent potliner | 10% |
| Briquette | 40% |
| Briquette composition: | |
| Portland cement | 15% |
| Waste from mineral wool production | 40% |
| Aluminium dross (treated aluminium salt slag) | 24% |
| Converter slag | 21% |

Chemical composition of melt:

| $SiO_2$ | 39.4 |
|---|---|
| $Al_2O_3$ | 20.3 |
| $TiO_2$ | 1.6 |
| $FeO$ | 7.7 |
| $CaO$ | 16.5 |
| $MgO$ | 8.7 |
| $Na_2O$ | 4.2 |
| $K_2O$ | 0.9 |
| $F_2$ | 0.7 |
| $Cl_2$ | 0.0 |

Melt viscosity no higher than 21 Poise at 1400° C.

EXAMPLE 6

| Diabase | 50% |
|---|---|
| Briquette | 50% |
| Briquette composition: | |
| Molasse | 8% |
| Burnt lime | 3% |

-continued

| | |
|---|---|
| Waste from mineral wool production | 28% |
| Aluminium dross (treated aluminium salt slag) | 24% |
| Converter slag | 3% |
| MSW (Municipal Solid Waste) fly ash | 34% |

The dross, slag and MSW fly ash each contain halogen. Chemical composition of melt:

| | |
|---|---|
| $SiO_2$ | 40.5 |
| $Al_2O_3$ | 20.4 |
| $TiO_2$ | 1.8 |
| FeO | 6.4 |
| CaO | 17.6 |
| MgO | 8.5 |
| $Na_2O$ | 2.3 |
| $K_2O$ | 1.6 |
| $F_2$ | 0.3 |
| $Cl_2$ | 0.5 (in melt) - 2.5% in process. |

Melt viscosity no higher than 24 Poise at 1400° C.

EXAMPLE 7

With K-index=40
100% briquettes consisting of:
11.9% cement
13.4% fluoride-containing apatite
17.2% olivin sand
26.1% limestone split
31.3% quartz sand
resulting chemical composition (in wt. %):

| $SiO_2$ | $Al_2O_3$ | $TiO_2$ | FeO | CaO | MgO | $Na_2O$ | $K_2O$ | $P_2O_5$ | $F_2$ |
|---|---|---|---|---|---|---|---|---|---|
| 46.5 | 1.6 | 0.2 | 1.2 | 32.8 | 10.3 | 0.2 | 0.4 | 6.2 | 0.45 |

EXAMPLE 8

100% briquettes consisting of:
11.9% cement
13.4% fluoride-containing apatite
13.4% olivin sand
18.7% steel slag with Cr and $F_2$
42.5% quartz sand
resulting chemical composition (in wt. %):

| $SiO_2$ | $Al_2O_3$ | $TiO_2$ | FeO | CaO | MgO | $Na_2O$ | $K_2O$ | $P_2O_5$ | $Cr_2O_3$ | $F_2$ |
|---|---|---|---|---|---|---|---|---|---|---|
| 53.6 | 2.9 | 0.3 | 4.4 | 22.7 | 7.9 | 0.2 | 0.5 | 5.6 | 0.5 | 0.6 |

What is claimed is:

1. A process for forming rock fibres comprising melting mineral solids and forming a melt containing calcium, magnesium and iron in a combined amount of more than 15% by weight of oxides of which at least 1% is iron oxide and forming the fibres from the melt, wherein 80 to 98% by weight of the mineral solids are low halogen mineral materials that each contain below 0.5% by weight halogen and 2 to 20% by weight of the mineral solids are high halogen mineral waste containing at least 1% by weight halogen and in which the melt comprise 0.05% to 2% fluorine.

2. A process according to claim 1 in which the melting of the high halogen mineral waste is accompanied by the formation of halogen-containing effluent gases, the gases are scrubbed before discharge to the atmosphere with a solid halide forming material and the resultant solid halide is added to the mineral solids as part of the high halogen waste.

3. A process according to claim 1 in which the low halogen mineral materials and the high halogen mineral waste are melted together in a furnace.

4. A process according to claim 1 in which a melt is formed of low halogen mineral material and the high halogen mineral waste is added as powder into the melt or immediately above the melt.

5. A process according to claim 1 in which the melt contains up to 5% halogen.

6. A process according to claim 1 in which the melt contains 0.3 to 2% fluorine.

7. A process according to claim 1 in which the melt contains at least 15% aluminium.

8. A process according to claim 1 in which the melt contains less than 10% alkali metal oxides.

9. A process according to claim 8 in which the amount of iron oxide is at least 3% by weight, the low halogen mineral materials contain below 0.2% by weight halogen, the high halogen mineral weight contain at least 3% by weight halogen and the halogen comprises fluorine.

10. A process according to claim 9 in which the amount of iron oxide is 5 to 12% by weight, the low halogen mineral contains 0.01–0.1% by weight halogen and the high halogen material contains 5–25% by weight halogen.

11. A process according to claim 1 in which the amount of high halogen mineral waste is at least 5% by weight.

12. A process according to claim 1 in which at least 50% of the halogen is fluorine.

13. A process according to claim 1 in which the melt contains a 30–51% silica, 14–35% alumina, 8–30% calcium oxide, 2–25% magnesium oxide, 2–15% iron oxide, a combined amount of iron and magnesium oxides of 10–30%, a combined amount of sodium and potassium oxides of not more than 10% by weight, a combined amount of calcium, sodium and potassium oxides of 10–30% by weight, an amount of titanium dioxide of not more than 6%, a combined amount of titanium dioxide and iron oxide of 4–18%, an amount of boron oxide up tp 5% by weight and an amount of phosphoerous oxide up to 8% by weight.

14. A process according to claim 1 in which the melt contains a 32–48% silica, 15–30% alumina, 10–25% calcium oxide, 2–20% magnesium oxide, 5–12% iron oxide, a combined amount of iron and magnesium oxides of 12–25%, a combined amount of sodium and potassium oxides of not more than 1–10% by weight, a combined amount of calcium, sodium and potassium oxides of 15–25% by weight, an amount of titanium dioxide of not more than 4%, a combined amount of titanium dioxide and iron oxide of 6–12%, an amount of boron oxide up to 3% by weight and an amount of phosphorous oxide up to 8% by weight.

* * * * *